United States Patent
Freeman et al.

(10) Patent No.: US 8,111,336 B2
(45) Date of Patent: Feb. 7, 2012

(54) CORRECTING SCANNED PROJECTOR DISTORTION BY VARYING THE SCAN AMPLITUDE

(75) Inventors: Mark O. Freeman, Snohomish, WA (US); Karlton D. Powell, Lake Stevens, WA (US)

(73) Assignee: Microvision, Inc., Redmond, WA (US)

( * ) Notice: Subject to any disclaimer, the term of this patent is extended or adjusted under 35 U.S.C. 154(b) by 423 days.

(21) Appl. No.: 12/505,415

(22) Filed: Jul. 17, 2009

(65) Prior Publication Data

US 2011/0013097 A1    Jan. 20, 2011

(51) Int. Cl.
*H04N 3/23* (2006.01)

(52) U.S. Cl. ............... 348/746; 348/747; 348/806

(58) Field of Classification Search .......... 348/745–747, 348/792, 793, 806, 807; 359/634, 205.1; 353/69, 70; 355/52, 53, 55, 56; *H04N 3/22, H04N 3/23, 9/28, 3/14*
See application file for complete search history.

(56) References Cited

U.S. PATENT DOCUMENTS

| 7,130,095 | B1 | 10/2006 | Wood |
| 7,800,732 | B2 * | 9/2010 | Zimmermann et al. ........ 355/53 |

FOREIGN PATENT DOCUMENTS

| EP | 0703714 | 3/1996 |
| JP | 08-149522 | 6/1996 |
| JP | 04315890 | 5/2009 |

OTHER PUBLICATIONS

PCT Search Report, , "PCT Search Report and Written Opinion", PCT Appl No. PCT/US2010/038214 for corresponding US case Jan. 24, 2011.

* cited by examiner

*Primary Examiner* — Sherrie Hsia
(74) *Attorney, Agent, or Firm* — Kevin D. Wills

(57) ABSTRACT

Briefly, in accordance with one or more embodiments, scanned beam projector may comprise a light source, a scan drive and a scanning platform to project an image onto a projection surface. The scan drive circuit is capable of at least partially correcting distortion in the projected image by varying an amplitude of the scan drive signal to at least partially compensate for the distortion in the projected image.

18 Claims, 7 Drawing Sheets

CORRECTING SCANNED PROJECTOR DISTORTION BY VARYING THE SCAN AMPLITUDE

BACKGROUND

The image projected by a projector may result in distortion due to off-axis projection and/or projection onto a non-flat or non-uniform projection surface. Typically, such projection distortion may be corrected by pre-compensating the video content prior to projecting the image, however this technique may not be ideal because it may cause a loss of potential brightness because the undistorted image created in this way is inscribed within the distorted field addressed by the scanner. In other words, by pre-compensating the video to reduce projection distortion, the duty cycle of the time the light is on versus the time the light is off is reduced, thereby lowering the brightness of the display. As a result, the user then either experiences a dimmer image, or the brightness of the image is required to be increased thereby wasting power.

Another common method for correcting projection distortion is to implement interpolation in the electronics of the projector to pre-distort the image or video content before it is projected, such that after projection the image will appear undistorted. In such an arrangement, the pre-distorted image has a resulting non-rectangular shape that is inscribed within the original area of the image source, assuming that the displayed image is intended to be rectangular. As result, some of the image source area is not fully utilized and the brightness will be non-uniform in the final projected image.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
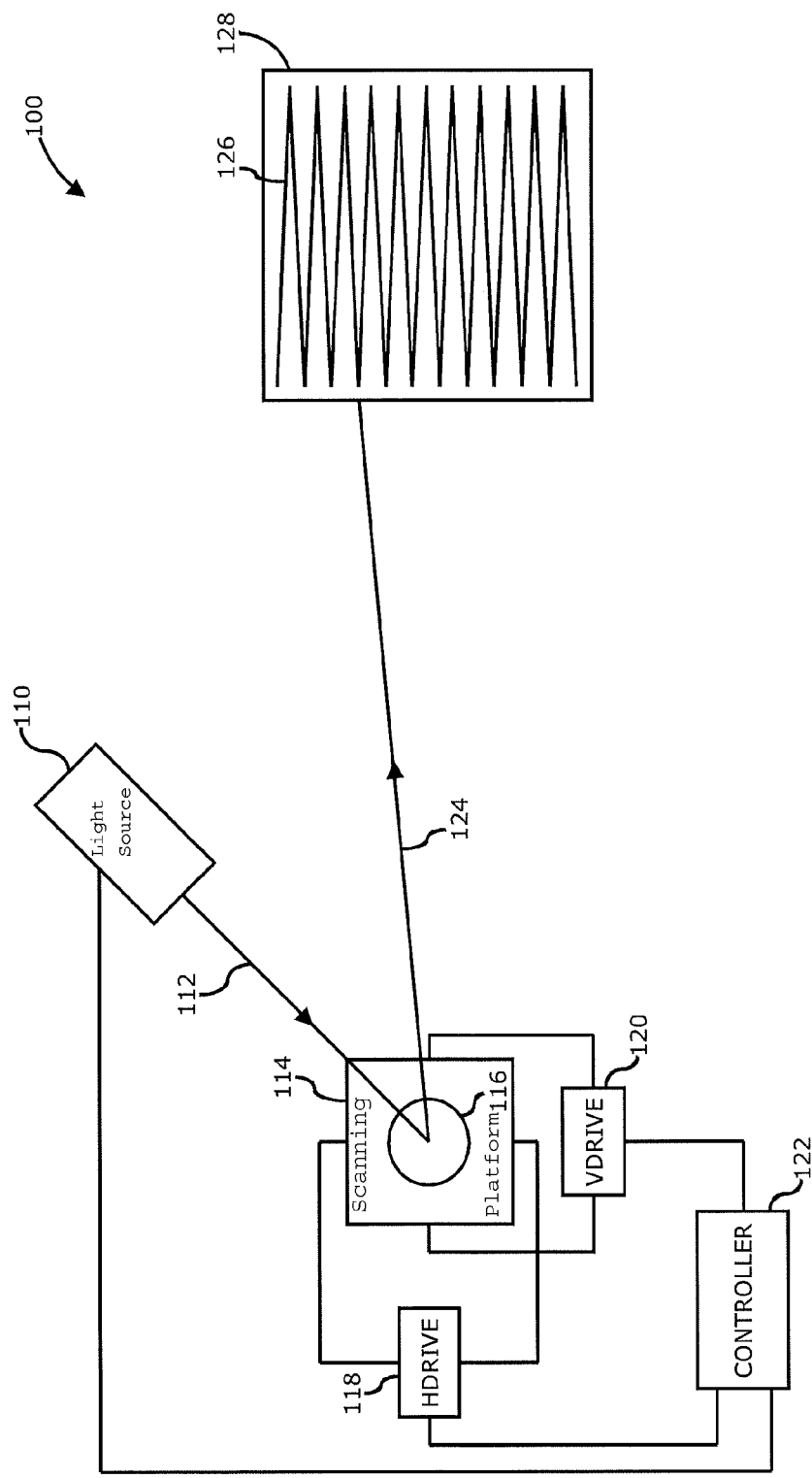
FIG. 1 is a diagram of a scanned beam display in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a scanned beam display in accordance with one or more embodiments will be discussed. Although FIG. 1 illustrates one type of a scanned beam display system for purposes of discussion, for example a microelectromechanical system (MEMS) based display, it should be noted that other types of scanning displays including those that use two uniaxial scanners, rotating polygon scanners, or galvanometric scanners as well as systems that use the combination of a one-dimensional spatial light modulator with a single axis scanner as some of many examples, may also utilize the claimed subject matter and the scope of the claimed subject matter is not limited in this respect.

As shown in FIG. 1, scanned beam display 100 comprises a light source 110, which may be a laser light source such as a laser or the like, capable of emitting a beam 112 which may comprise a laser beam. In some embodiments, light source may comprise two or more light sources, such as in a color system having red, green, and blue light sources, wherein the beams from the light sources may be combined into a single beam. The beam 112 impinges on a scanning platform 114 which may comprise a microelectromechanical system (MEMS) based scanner or the like in one or more embodiments, and reflects off of scanning mirror 116 to generate a controlled output beam 124. In one or more alternative embodiments, scanning platform 114 may comprise a diffractive optic grating, a moving optic grating, a light valve, a rotating mirror, a spinning silicon device, a digital light projector device, a flying spot projector, or a liquid-crystal on silicon device, or other similar scanning devices. A horizontal drive circuit 118 and/or a vertical drive circuit 120 modulate the direction in which scanning mirror 116 is deflected to cause output beam 124 to generate a raster scan 126, thereby creating a displayed image, for example on a projection surface and/or image plane 128. A display controller 122 controls horizontal drive circuit 118 and vertical drive circuit 120 by converting pixel information of the displayed image into laser modulation synchronous to the scanning platform 114 to write the image information as a displayed image based upon the position of the output beam 124 in raster pattern 126 and the corresponding intensity and/or color information at the corresponding pixel in the image. Display controller 122 may also control other various functions of scanned beam display 100.

In one or more embodiments, for two dimensional scanning to generate a two dimensional image, a horizontal axis may refer to the horizontal direction of raster scan 126 and the vertical axis may refer to the vertical direction of raster scan 126. Scanning mirror 116 may sweep the output beam 124 horizontally at a relatively higher frequency and also vertically at a relatively lower frequency. The result is a scanned trajectory of laser beam 124 to result in raster scan 126. The fast and slow axes may also be interchanged such that the fast scan is in the vertical direction and the slow scan is in the horizontal direction. However, the scope of the claimed subject matter is not limited in these respects.

In one or more particular embodiments, the scanned beam display as shown in and described with respect to FIG. 1 may comprise a pico-projector developed by Microvision Inc., of Redmond, Wash., USA, referred to as PicoP™. In such embodiments, light source 110 of such a pico-projector may comprise one red, one green, and one blue laser, with a lens near the output of the respective lasers that collects the light from the laser and provides a very low numerical aperture (NA) beam at the output. The light from the three lasers may then be combined with dichroic elements into a single white beam 112. Using a beam splitter and/or basic fold-mirror optics, the combined beam 112 may be relayed onto biaxial MEMS scanning mirror 116 disposed on scanning platform 114 that scans the output beam 124 in a raster pattern 126. Modulating the three lasers synchronously with the position of the scanned output beam 124 may create the projected image. In one or more embodiments the scanned beam display 100, or engine, may be disposed in a single module known as an Integrated Photonics Module (IPM), which in some embodiments may be 7 millimeters (mm) in height and less than 5 cubic centimeters (cc) in total volume, although the scope of the claimed subject matter is not limited in these respects.

In one or more embodiments, the technology utilized for the red and blue lasers in scanned beam display 100 may be substantially similar to the technology of similar lasers that are used for the optical disk storage devices, with the main difference being a slight shift in the particular wavelengths provided by the lasers. Such lasers may be fabricated from materials such as gallium aluminum indium phosphide (GaAlInP) for red laser diodes and gallium nitride (GaN) for blue laser diodes. In one or more embodiments, the technology for green lasers may be based on infrared or near-infrared lasers developed for the telecom industry. Near-infra-red laser diodes with very high modulation bandwidths may be utilized in combination with a frequency-doubling crystal, for example periodically poled lithium niobate (LiNbO3), to produce a green laser that is capable of being directly modulated. The choice of which wavelength to use for the lasers may be based at least in part on at least two considerations. First is the response of the human eye, known as the photopic response, to different wavelengths. This response is an approximate Gaussian curve that peaks at or near the green-wavelength region and falls off significantly in red and blue regions. The amount of red and blue power needed to get a white-balanced display may vary rapidly with wavelength. For example, eye response increases by a factor of two when the wavelength is changed from 650 nanometers (nm), the wave-length used for digital video disc (DVD) drives, to 635 nm. Such a change in wavelength allows the required laser power to drop by the same factor, thereby resulting in scanned beam display 100 that is able to operate at lower power. Similarly, the blue laser may be chosen to have as long a wavelength as possible. Currently, blue lasers in the range of 440 to 445 nm are typical, and eventually practical blue lasers having longer wavelengths in the range of 460 to 470 nm may be provided. The second consideration is color gamut. Since the photopic response is at or near peak value through the green wavelength range, the green wavelength may be chosen to enhance the color of the display. For example, green lasers at or near 530 nm may be utilized for maximizing or nearly maximizing the color gamut. Since the ability to directly modulate the lasers is a main feature of scanned beam display 100, pixel times at or near the center of a Wide Video Graphics Array (WVGA) scanned display may be on the order of 20 nanoseconds (ns). As a result, the lasers may have modulation bandwidths on the order of about 100 MHz. It should be noted that these are merely examples for the types and characteristics of the lasers that may be utilized in scanned beam display 100, and the scope of the claimed subject matter is not limited in these respects.

In one or more embodiments of scanned beam display 100, the remainder of the optics engine operates to generate a single pixel at a particular position of the output beam 124 in raster scan 126. All three lasers may be driven simultaneously at levels to create a proper color mix for each pixel to produce brilliant images with the wide color gamut available from red, green, blue (RGB) lasers. Direct-driving of the lasers pixel-by-pixel at or near the levels involved for each pixel provides suitable power efficiency and inherently high contrast. As a result, in such embodiments the efficiency of scanned beam display may be maximized or nearly maximized since the lasers may be only on at the level needed for each pixel. The contrast may be high because the lasers are completely off for black pixels rather than using, for example, a spatial light modulator (SLM) to deflect or absorb any excess intensity. The single-pixel collection optics may be optimized to take the particular beam properties of the red, green, and/or blue laser and relay it through the scanned beam display and onto the projection surface 128 with high efficiency and/or image quality. The pixel profile may be designed to provide high resolution and infinite focus with a smooth non-pixelated image. In some embodiments, with a relatively simple opto-mechanical design for scanned beam display 100, at least some of the display complexity may be handled by the electronics systems to control accurate placement of pixels and to modulate the laser at pixel rates.

In one or more embodiments of a raster-scanned beam display 100, no projection lens may be utilized or otherwise needed. In such embodiments, the projected output beam 124 directly leaves the scanned beam display 100 and creates an image on whatever projection surface 128 upon which output beam 124 is projected. Because of the scanned single pixel design, light-collection efficiency may be kept high by placing the collection lenses near the output of the lasers while the NA of output beam 124 is very low. By design, the rate of expansion of the single-pixel beam may be matched to the rate that the scan tied image size grows. As a result, the projected image is always in focus. This special property of scanned beam display 100 comes from dividing the task of projecting an image into using a low NA single-pixel beam to establish the focus and a two-dimensional (2D) scanner to paint the image. In particular embodiments, the scanning platform 114 may implement the role of fast projection optics by producing an image that expands with a 43° horizontal projection angle. Such an arrangement may not be achieved in more traditional projector designs where projection optics may be used to image a spatial light modulator onto the projection screen due to conflicting constraints on the projection lens. On the one hand, a short focal length lens may be utilized to create an image that grows quickly with projection distance, while on the other hand, the lens aperture is typically large to maximize the projector's brightness. Such constraints may involve a fast projection lens with F/2 lenses being typical. Depth of focus is proportional to F-stop. The trade-off for traditional projector designs balances the rate the image grows with distance, light efficiency and/or depth of focus.

In some embodiments of scanned beam display 100, the spot size as a function of projection distance may grow at a rate matched or close to the growth of a single pixel. Assuming a moderately fast F/4 projection lens and a focal length chosen to give the same 43° rate or growth with projection distance for the projected image, the depth of locus for an imaging-type projector is greatly reduced compared to the scanned laser. To the user, this means that the typical imaging-type projector should be refocused as the projection distance is changed, and that portions of the image may be out of focus when one projects onto surfaces that present a range of projection distances within the image, for example projecting onto a flat surface at an angle or onto surfaces with a significant three-dimensional (3D) profile.

Figure 2:
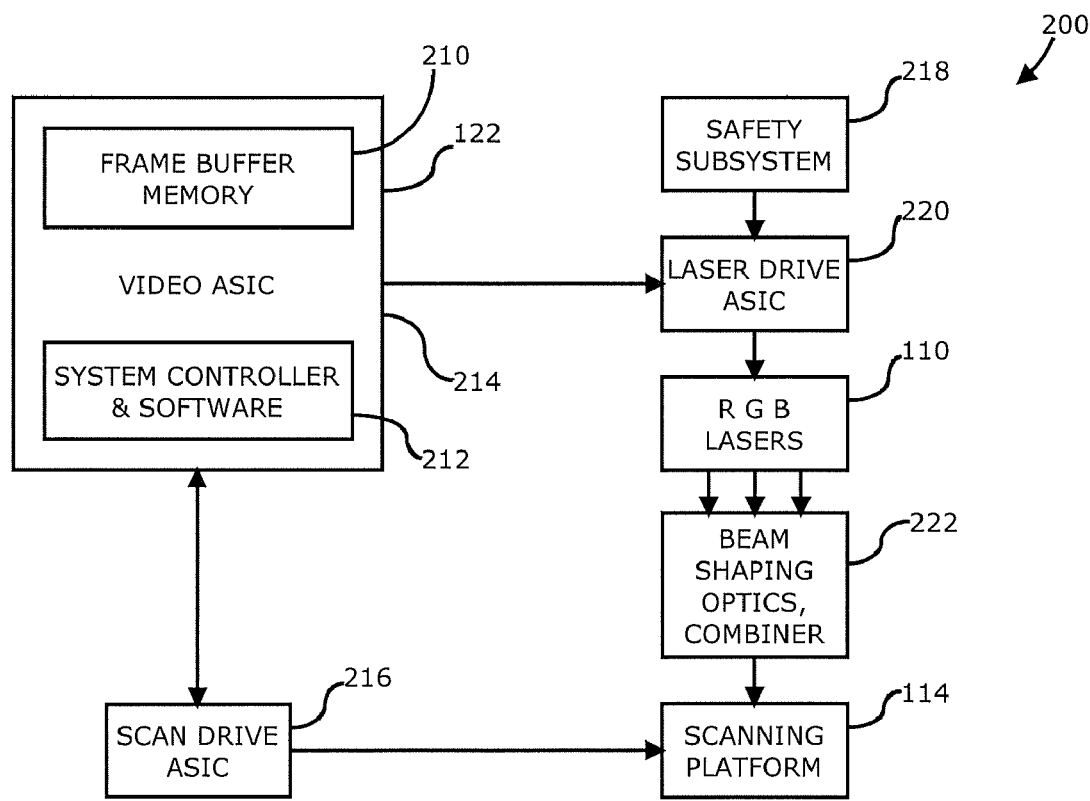
FIG. 2 is an a block diagram of the electronic circuits of a scanned beam display in accordance with one or more embodiments.

Referring now to FIG. 2, a block diagram of the electronic circuits of a scanned beam display in accordance with one or more embodiments will be discussed. With the simplification of the optomechanical projector engine design, a greater portion of the display emphasis may be shifted to the electronics. This allows the physical size of the projector engine to be relatively minimized to accommodate hand-held consumer products. The electronics, which can be integrated more straight-forwardly into consumer products, take over tasks that are done optically with other projector designs. Some of the tasks that are shifted include pixel positioning, color alignment and brightness uniformity. In some embodiments of scanned beam display 100, the video processor and controller 122 for scanning platform 114 may be implemented as one or more custom application-specific integrated circuits (ASICs) that drive the scanned beam display 100 of FIG. 1.

In one or more embodiments, such an electronics system 200 may comprise scan drive ASIC 216 which may comprise horizontal drive circuit 118 and vertical drive circuit 120 as shown in FIG. 1 for driving scanning platform 114 to generate a raster scan 126. In some embodiments, scan drive ASIC 218 may drive scanning platform 114 under closed loop control. The horizontal scan motion may be created by driving the horizontal axis of scanning platform 114 at its resonant frequency which typically may be about 18 kHz for a Wide Video Graphics Array (WVGA) type scanner. The horizontal scan velocity may vary sinusoidally with position. In particular embodiments, scan drive ASIC 216 may utilize feedback from sensors on scanning platform 114 to keep the system on resonance and/or at fixed scan amplitude. The projected image is drawn in both directions as scanning platform 114 sweeps the beam back and forth. Such an arrangement may increase the efficiency of scanning platform 114 in at least two ways. First, by running on resonance the power required to drive the scan mirror may be reduced and/or minimized. However, in some embodiments scanning platform 114 may be non-resonantly driven. Second, bi-directional video increases and/or maximizes the laser use efficiency by minimizing the video blanking interval. As a result, the image projected by scanned beam display 100 may be brighter for a given power output of laser 110, although the scope of the claimed subject matter is not limited in these respects. In some embodiments, the vertical scan direction may be driven with a standard sawtooth waveform to provide constant velocity from the top to the bottom of the image and a rapid retrace back to the top to begin a new frame. The vertical scan motion also may be managed in closed loop fashion by scan drive ASIC 216 based at least in part on position feedback from scanning platform 114 to maintain a smooth and/or linear trajectory. The frame rate typically may be 60 Hz for an 848×480 WVGA resolution. The frame rate may be increased if the projector is used in lower resolution applications, although the scope of the claimed subject matter is not limited in this respect. Further details of the scan drive waveforms are shown in and described with respect to FIG. 3, below.

In one or more embodiments, controller 122 of FIG. 1 may comprise a video ASIC 214 as shown in FIG. 2 as an embodiment of controller 122. In some embodiments, video ASIC 214 accepts either red, green, blue (RGB) and/or luma/chrominance (YUV) video signal inputs. Video ASIC 214 may include a frame buffer memory 210 to allow artifact free scan conversion of input video. Gamma correction and/or color space conversion may be applied to enable accurate mapping of input colors to the wide laser color gamut. An optional scaling engine may be provided for upconverting lower resolution video content. In one or more embodiments, video ASIC 214 may implement a Virtual Pixel Synthesis (VPS) engine that utilizes high-resolution interpolation to map the input pixels to the sinusoidal horizontal trajectory of scanning platform 114. Such a VPS engine is an example of how functions of scanned beam display 100 may be shifted from being implemented in optics to being implemented electronics by electronics system 200 in a scanned laser paradigm. The VPS engine effectively may map the input pixels onto a high-resolution virtual coordinate grid. Besides enabling the repositioning of video information with subpixel accuracy onto the sinusoidal scan, the VPS engine may further optimize the quality of the projected image. Brightness uniformity also may be managed in the VPS engine by adjusting coefficients that control the overall brightness map for the scanned beam display 100.

In one or more embodiments, the VPS engine implemented by video ASIC 214 may compensate optical distortions, for example keystone, parallelogram, and/or some types of pin-cushion distortion, and/or any arbitrary or intentional type of distortion including but not limited to distortion from varying surface profile or relief, wherein the VPS engine may be utilized to adjust the pixel positions. The VPS engine also may allow the pixel positions for each color to be adjusted independently. Such an arrangement may simplify the manufacturing alignment of scanned beam display 100 by relaxing the requirement that the three laser beams of laser 110 be perfectly mechanically aligned. The positions of the red, green and/or blue pixels may be adjusted electronically to bring the video into perfect, or nearly perfect, alignment, even if the laser beams are not themselves sufficiently aligned. Such an electronic pixel alignment capability also may be utilized to compensate for some types of chromatic aberration if scanned beam display 100 is deployed as an engine in a larger optical system, although the scope of the claimed subject matter is not limited in this respect. In some embodiments, mapping from digital video coding performed by video ASIC 214 to laser drive ASIC 220 may be performed by an Adaptive Laser Drive (ALD) system implemented by system controller and software 212. In some embodiments, the ALD may comprise a closed-loop system that utilizes optical feedback from each laser to actively compensate for changes in the laser characteristics over temperature and/or aging. Such an arrangement may ensure optimum, or nearly optimum, brightness, color and/or grayscale performance. Unlike other display systems, optical feedback further may be incorporated to ensure optimum color balance and/or grayscale. Other electronic blocks in electronics system 200 may include safety subsystem 218 to maintain the output power of lasers 100 within safe levels, and/or beam shaping optics and combiner 222 to shape and/or combine the beams from individual lasers 110 into a single beam applied to scanning platform 114. However, FIG. 2 shows one example arrangement of electronics system 200 of a scanned beam display, and the scope of the claimed subject matter is not limited in these respects.

In one or more embodiments, the components of scanned beam display 100 and/or components of electronics system 200 may be arranged for operation in a mobile format or environment. Such an example scanned beam display 100 may include the following specifications. The height or thickness and/or volume of scanned beam display 100 may be minimized or nearly minimized, for example a height from about 7 to 14 mm and in overall volume from 5 to 10 cc. Brightness may be affected by the available brightness of the light sources, either lasers or light emitting diodes (LEDs), the optical efficiency of the projector design, and/or lower-power operation in order to maximize battery life. In some embodiments, the brightness of the image projected by scanned beam display may be in the range of about 5 to 10 lumens. For image size, a projection angle in the range of 30 to 45 degrees may be utilized and in one or more particular embodiments the projection angle may be about 53 degrees with a one-to-one (1:1) distance to image size ratio, although the scope of the claimed subject matter is not limited in these respects. For mobile applications, scanned beam display 100 may provide focus free operation wherein the distance from the display to the displayed image will likely change often. The wide screen format generally may be desirable for viewing video content wherein scanned beam display 100 may provide resolutions from quarter video graphics array (QVGA) comprising 320×240 pixels to wide video graphics array (WVGA) comprising 848×480 pixels, as merely some examples. In some embodiments, scanned beam display 100 typically utilizes either color lasers and/or red, green and blue LEDs for light sources. In both embodiments, the result is large color gamuts that far exceed the usual color range typically provided televisions, monitors, and/or conference-room-type projectors. In some embodiments, white LEDs may be utilized used with color filters to yield a reduced color gamut. Contrast likewise may be maximized, or nearly maximized. Contrast may be referred to as the dynamic range of scanned beam display 100. In one or more embodiments, a target specification for power consumption may be to provide a battery life sufficient to watch an entire movie, which may be at least about 1.5 hours. It should be noted that these are merely example design specifications for scanned beam display 100, and the scope of the claimed subject matter is not limited in these respects.

Figure 3:
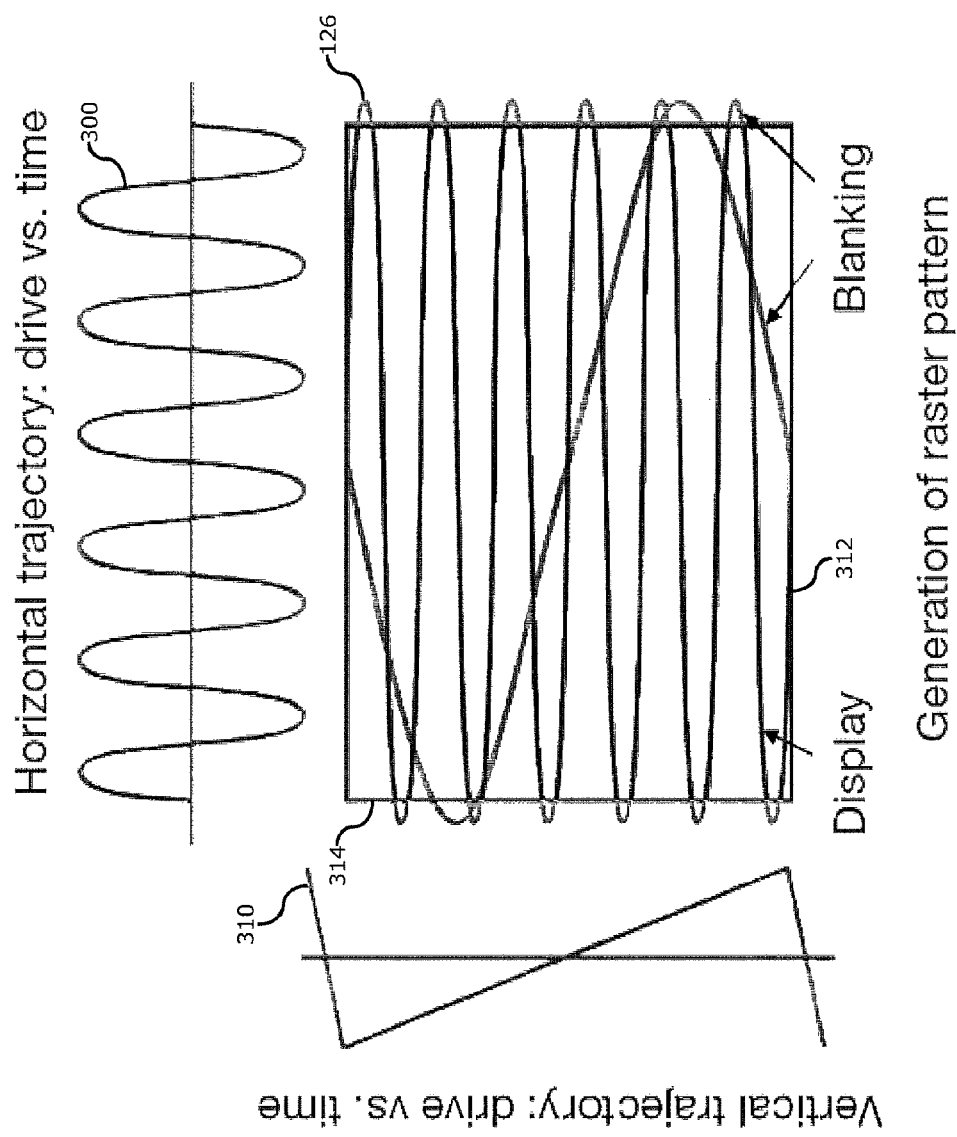
FIG. 3 is a diagram illustrating the generation of a raster pattern by a biaxial two-dimensional scanning platform in accordance with one or more embodiments.

Referring now to FIG. 3, a diagram illustrating the generation of a raster pattern by a biaxial two-dimensional scanning platform in accordance with one or more embodiments will be discussed. In one or more embodiments, scanning platform 114 may comprise a biaxial microelectromechanical system (MEMS) scanner made using standard bulk silicon MEMS fabrication processes. However, it should be noted that, although a MEMS scanner is discussed as but one example, other types of scanners and/or display technologies may instead be utilized, and the scope of the claimed subject matter is not limited in this respect. Where scanned beam display 100 comprises a WVGA projector, scan mirror 116 may have a diameter of approximately 1 mm, and scanning platform 114 may produce an active video scan cone of about 43.2° by 24.3°. The MEMS die may be housed in a package with smaller magnets that provide a magnetic field oriented at approximately 45° to the scan axes. A single composite drive signal may be applied that contains the superposition of the horizontal-scan horizontal drive waveform at the resonant frequency of the horizontal motion of scan mirror 116 and the 60 Hz vertical drive sawtooth waveform 310. The mechanical design of the MEMS based scanning platform allows motion along only the two orthogonal scan directions. Mechanical filtering resulting from the different mass and flexure stiffness of the MEMS device governing horizontal and vertical motion sorts the drive signals by frequency content, thereby inducing an 18 kHz resonant motion of the horizontal axis and a 60 Hz sawtooth motion of the vertical axis. Piezo-resistive sensors may be utilized to provide feedback regarding the position of scan mirror 116 to scan drive ASIC 216 to maintain closed loop accuracy of the desired scan mirror motion. In some displays in some embodiments, the roles of the vertical scan axis and the horizontal scan axis may be interchanged from that shown in and described with respect to FIG. 3, and the scope of the claimed subject matter is not limited in these respects.

Figure 4:
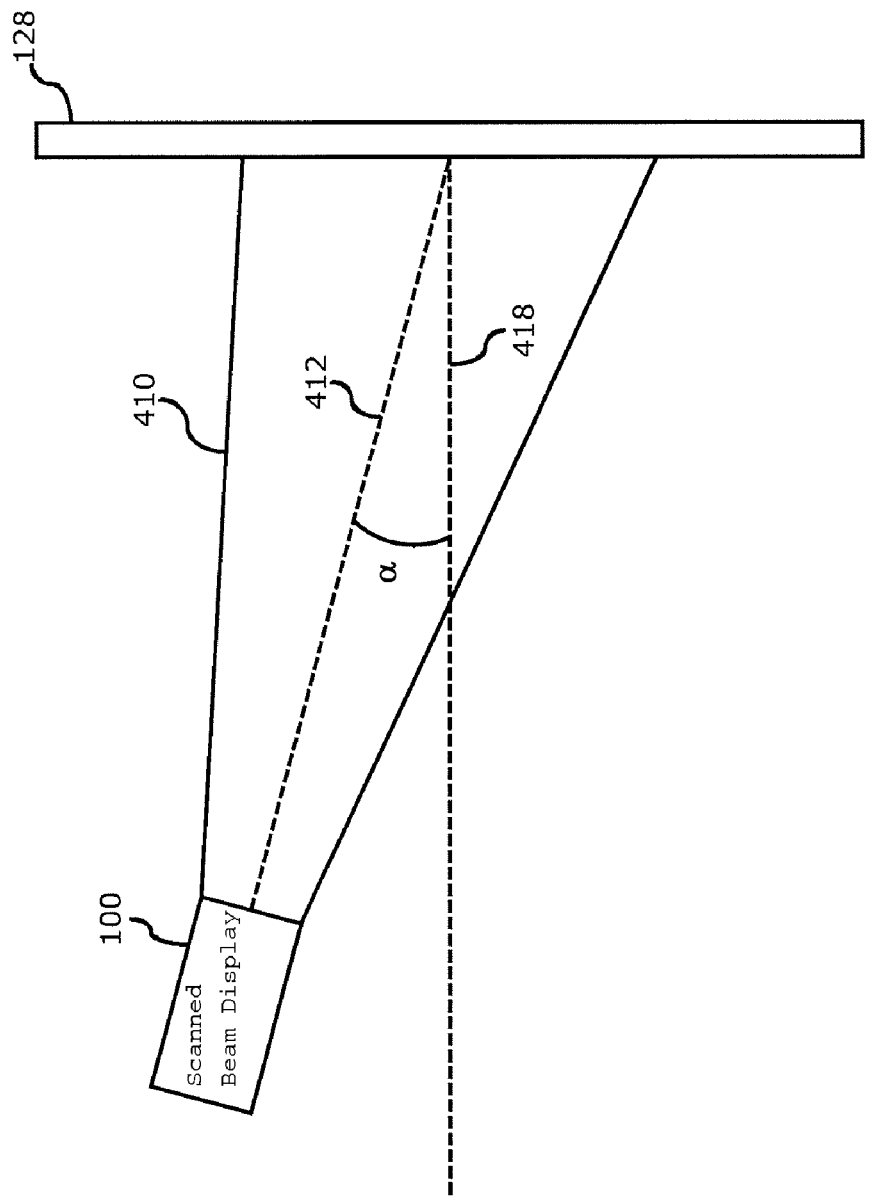
FIG. 4 is a diagram illustrating the generation of distortion in a projected image as a result of off-axis projection in accordance with one or more embodiments.

Referring now to FIG. 4, a diagram illustrating the generation of distortion in a projected image as a result of off-axis projection in accordance with one or more embodiments will be discussed. In some instances during the operation of scanned beam display 100, the operator may position scanned beam display 100 such that the center line 412 of its output cone 410 is generally disposed at an angle, α, that is offset from line 418 normal to projection surface 128. This arrangement generally may be referred to as off-axis projection. As a result, where the projected image is intended to be rectilinear in shape, the off-axis projected image may suffer from a keystone effect, or keystoning, wherein the image has a trapezoidal, or keystone, shape. Such a keystone distorted image is shown in and described with respect to FIG. 5, below. It should be noted that in general, the distortion of the image resulting in keystoning may result from an off-axis projection in a vertical direction, or in a horizontal direction, or combinations thereof, and the scope of the claimed subject matter is not limited in this respect.

Figure 5:
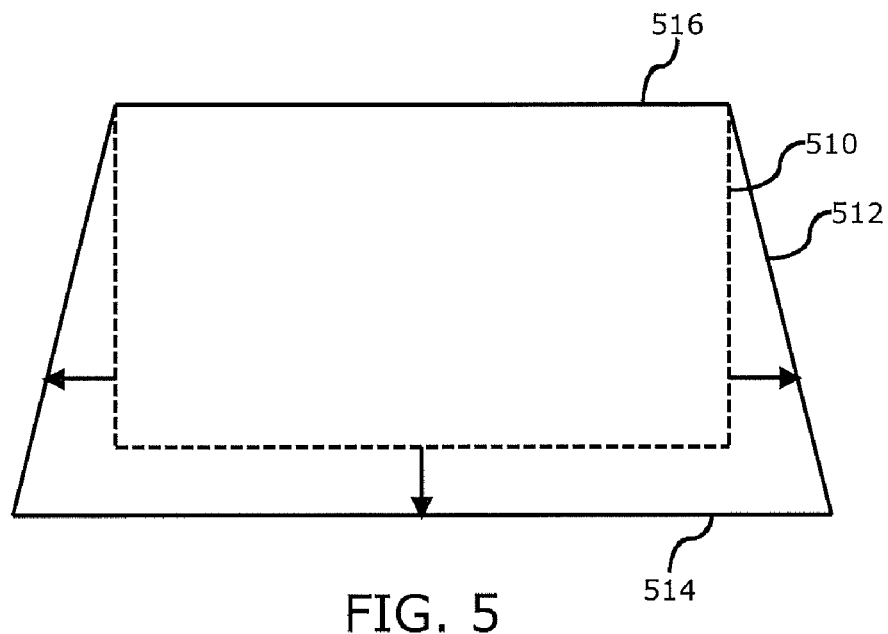
FIG. 5 is a diagram illustrating keystone distortion that is able to be corrected in accordance with one or more embodiments.

Referring now to FIG. 5, a diagram illustrating keystone distortion that is capable of being corrected in accordance with one or more embodiments will be discussed. An intended rectilinear image is shown at 510. However, distortion from off-axis projection may pulls and/or stretch parts of the image as shown by the arrows such that the resulting distorted image 512 is generally a trapezoid or keystone. For example, such keystone distortion may result from projecting a nominally rectangular image onto a planar projection surface 128 at non-normal incidence as shown in FIG. 4. In an example keystone distortion scenario as shown in FIG. 5, the bottom 514 of the image 510 is stretched relative to the top 516 of the image 510. Since the light in the stretched regions is spread out over a larger area, the relative brightness in the stretched areas of the bottom 514 of the distorted image 512 lower than the unstretched top 516 of the distorted image 512. Correction of the distortion including restoring the brightness uniformity may be accomplished by varying the amplitude profile of scanned beam display 100 shown in and described with respect to FIG. 6 and/or FIG. 7, below. Many other types distortions other than keystone distortion, for example pincushion distortion or barrel distortion, as well as any arbitrary or intentional distortion that may be introduced by projecting onto a surface with some arbitrary non-planar surface relief, likewise may be corrected with brightness uniformity restored via utilization of the technique of adjusting scan profiles as discussed, below. Likewise, the technique can be used to introduce distortions that may be required for some applications.

Figure 6:
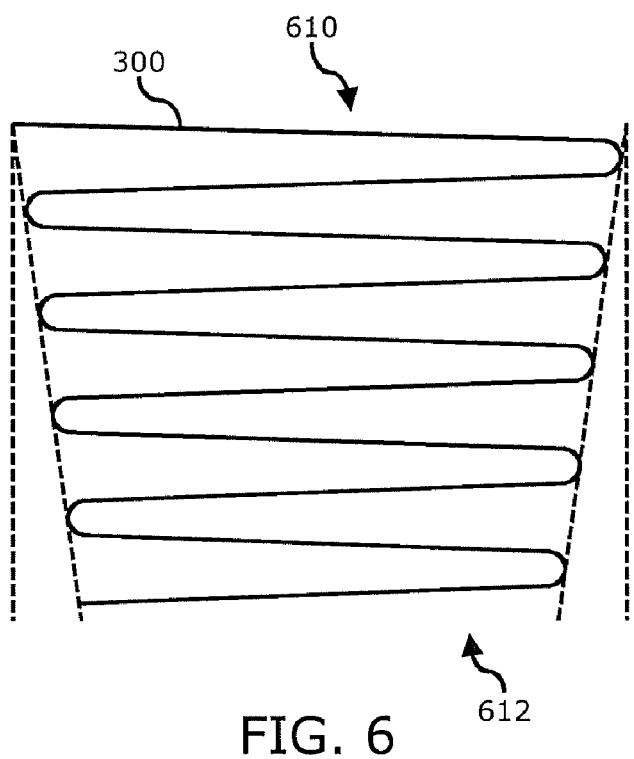
FIG. 6 is a diagram illustrating correction of distortion in a projected image via altering the amplitude of a horizontal axis in accordance with one or more embodiments.

Referring now to FIG. 6, a diagram illustrating correction of distortion in a projected image via altering the amplitude of a horizontal axis in accordance with one or more embodiments will be discussed. Correction of keystone distortion is shown as an example in FIG. 6. As illustrated in FIG. 6, the horizontal amplitude profile may be varied as a function of vertical position of the scanned beam in order to undo or otherwise correct the keystone distortion. For example, the top region 610 of the raster scan may correspond to the unstretched top 516 region of the distorted image 512, wherein little or no change in the amplitude of the horizontal scan drive signal 300 may be implemented. As the horizontal scan drive signal 300 moves down toward the bottom region 612 of the raster scan, the amplitude of the horizontal scan drive signal 300 may be decreased by a greater amount to reduce horizontal stretching from the distorted image 512. In general, the amount of decrease in amplitude of the horizontal scan drive signal 300 may be linear and in a generally opposite and equal or nearly equal magnitude as the size of the side of the trapezoid or keystone of the distorted image 512. Such a linear amplitude adjustment of the horizontal scan drive signal 300 would effectively restore the rectangular shape of the image in the horizontal direction, that is the sides of the trapezoid, and furthermore would significantly restore the brightness uniformity. In order to completely or nearly completely restore the brightness uniformity and to restore the raster pitch or line spacing at the bottom of the image from vertical stretching, adjustment in the slow, vertical scan drive signal may be implemented as shown in and described with respect to FIG. 7, below.

Figure 7:
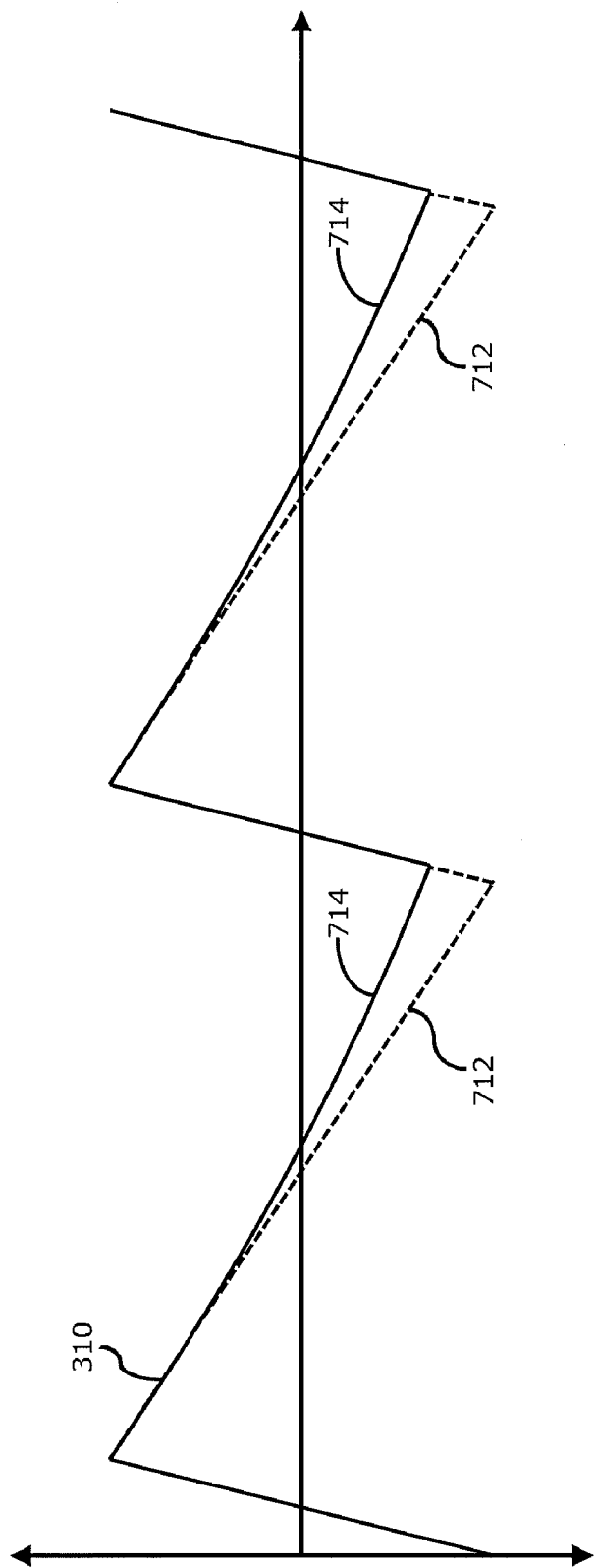
FIG. 7 is a diagram illustrating correction of distortion in a projected image via altering the amplitude of a vertical axis in accordance with one or more embodiments.

Referring now to FIG. 7, a diagram illustrating correction of distortion in a projected image via altering the amplitude of a vertical axis in accordance with one or more embodiments will be discussed. As shown in and described with respect to FIG. 3, the vertical scan drive signal 300 may be generally a sawtooth waveform. To correct the vertical stretching of the distorted image 512, the original portions 712 of the original vertical scan drive signal 310 may be decreased in amplitude to result in portions 714 of the waveform having a reduced magnitude in amplitude at a point or points in time that correspond to when the raster scan 126 is in the bottom 514 of the distorted image 512. Other regions of vertical scan drive signal 310 may be less reduced in amplitude or not reduced in amplitude when raster scan 126 is at or near the top 516 of the distorted image 512. Such a reduction in the amplitude of the vertical scan drive signal may effectively unstretch the distorted image 512 in the vertical direction to restore the vertical shape of the image to its originally intended rectilinear shape, and furthermore may restore brightness uniformity along with the brightness correction achieved via the change in the amplitude of the horizontal scan drive signal, alone or in combination. Although one example of image distortion correction is shown in FIG. 5, FIG. 6, and FIG. 7 for correcting keystone distortion, it should be noted that in one or more other embodiments other types of image distortion may be reduced or corrected via varying the amplitude of the horizontal scan drive signal and/or the vertical scan drive signal, independently or in combination. In general, the amplitude of the horizontal scan drive signal may be increased or decreased, or both, as a function of vertical position of the raster scan. Likewise the amplitude of the vertical scan drive signal may be increased or decreased, or both, as a function of the vertical position of the raster scan. In some embodiments, the amplitude correction may be a linear function and in other embodiments the amplitude correction may be a non-linear function, and amplitude correction of the horizontal and vertical scan signals may be independently implemented with only one or the other being implemented, or both may be implemented in combination. However, the scope of the claimed subject matter is not limited in these respects. In some embodiments, the type and/or the amount of image distortion may be monitored or detected and then corrected in a feedback loop as shown in and described with respect to FIG. 8, below. Furthermore, in one or more embodiments, the concepts of image distortion correction may be applied to any orientation of the projected image, including but not limited to a case wherein the image is rotated 90 degrees, for example, and/or rotated by any amount, about an axis. In such cases, the amount of distortion correction in any axis may be a function of the amount of rotation of the image, including for example in the case of a 90 or 270 degree rotation wherein the roles of the horizontal axis and the vertical axis may be reversed. However, this is merely an example of how distortion correction may be a function of the amount of rotation of the projector and/or of the projected image, and the scope of the claimed subject matter is not limited in these respects.

Figure 8:
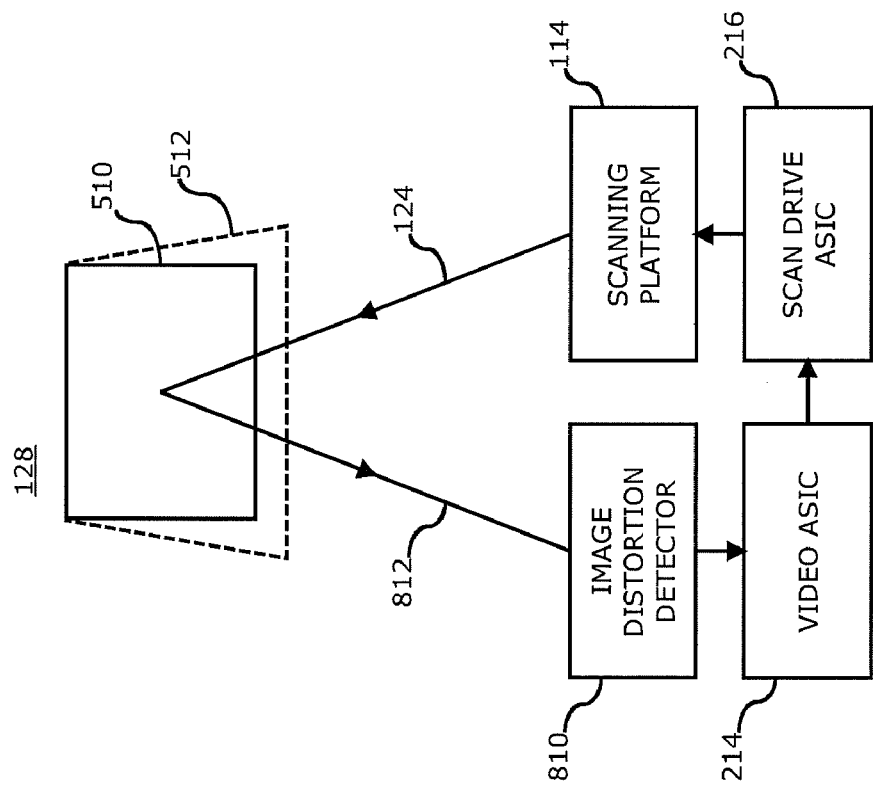
FIG. 8 is a diagram illustrating detection and correction of distortion in a projected image via a feedback loop in accordance with one or more embodiments.

Referring now to FIG. 8, a diagram illustrating detection and correction of distortion in a projected image via a feedback loop in accordance with one or more embodiments will be discussed. In one or more embodiments, scanned beam display 100 may project an intended rectilinear (or other intended shape) image 510 onto a projection surface 128 by projecting an output beam 124 onto the projection surface 128. In the event there is distortion in the image that results in a distorted image 512, the distorted image 512 may be detected by an image distortion detector 810 which receives an input 812 corresponding to the distorted image 512. Image distortion detector 810 may comprise, for example, an imaging array such as a charge-coupled device (CCD) array or a complementary metal-oxide semiconductor (CMOS) array to capture the distorted image 512 as an input 812. The distorted image 512 detected by image distortion detector 810 may then be provided to video ASIC 214 for correcting the video drive signals provided to scan drive ASIC 216 based at least in part on the detected image distortion to provide compensated video drive signal to correct the image distortion. As a result, scan drive ASIC 216 drives scanning platform 114 with such a compensated video drive signals such that scanning platform 114 displays the intended rectilinear, or other intended shape, image 510. The arrangement of scanned beam display 100 including an image distortion detector 810 thus may operate in a feedback loop to detect and correct for distortion in the displayed image. In some embodiments, the feedback loop may continue to detect image distortion and correct the detected distortion on an ongoing basis, for example continuously or periodically, so that image distortion may be corrected as the distortion in the projected image varies with time. For example, where the user may be holding scanned beam display 100 in the user's and the user may be unsteady or moving over time, the feedback loop including image distortion detector 810 may correct distortion in the image in response to such user movements.

In one or more embodiments, image distortion detector 810 may include one or more orientation sensors, accelerometers such as a MEMS accelerometer, and/or gravity sensors such that the orientation and/or position of the housing in which scanned beam display 100 is disposed may be detected and the resulting distortion in the projected image may be predicted or calculated based at least in part on the orientation of the housing. In such embodiments, such orientation detection to detect image distortion may be performed without requiring an image capture mechanism, or alternatively may be performed in combination with image capture to provide a determination of the orientation of the display housing with respect to projection surface 128 and/or to determine the amount and/or type of image distortion in the projected image. In embodiments in which the orientation of the housing of scanned beam display 100 is detected to detect image distortion, a user may set a reference point or a zero point when the image is displayed as intended and the normal reference point or zero point may be stored in a memory, for example a memory disposed in video ASIC 214 or coupled to video ASIC 214. Image distortion detector 810 may then detect in changes in the orientation of the housing away from the reference point or the zero point, and then video ASIC 214 may determine the amount image distortion in the projected image to compensate the video drive signals accordingly to correct such image distortion. It should be noted that these are merely examples of how image distortion may be detected by image distortion detector 810 to be corrected by video ASIC 214, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to correcting scanned projector distortion by varying the scan amplitude and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
a light source to generate a light beam;
a scan drive circuit to generate a scan drive signal in response to a video signal; and
a scanning platform to receive the light beam and generate a raster pattern in response to the scan drive signal to project an image onto a projection surface;
said scan drive circuit being capable of at least partially correcting distortion in the projected image by varying an amplitude of the scan drive signal to at least partially compensate for the distortion in the projected image, wherein the scan drive signal comprises a drive signal component, said scan drive circuit varying an amplitude or waveform shape of the drive signal component as a function of time in the raster pattern to at least partially correct the distortion in the projected image.

2. An apparatus as claimed in claim 1, wherein said scan drive circuit varying an amplitude of the drive signal component along a first axis of the raster pattern as a function of position in the raster pattern along a second axis of the raster pattern to at least partially correct the distortion in the projected image.

3. An apparatus as claimed in claim 2, the drive signal component comprising a horizontal drive signal component, or a vertical drive signal component, or combinations thereof, wherein the amplitude of the drive signal component is varied by increasing the amplitude, or decreasing the amplitude.

4. An apparatus as claimed in claim 2, the drive signal component comprising a horizontal drive signal component, or a vertical drive signal component, or combinations thereof, wherein the amplitude of the drive signal component is varied linearly or non-linearly.

5. An apparatus as claimed in claim 1, wherein the scan drive signal comprises a horizontal drive signal component, said scan drive circuit varying an amplitude of the horizontal drive signal component as a function of vertical position in the raster pattern to at least partially correct the distortion in the projected image.

6. An apparatus as claimed in claim 1, wherein the scan drive signal comprises a vertical drive signal component, said scan drive circuit varying an amplitude or waveform shape of the vertical drive signal component as a function of time in the raster pattern to at least partially correct the distortion in the projected image.

7. An apparatus as claimed in claim 1, the drive signal component comprising a horizontal drive signal component, or a vertical drive signal component, or combinations thereof, wherein the amplitude or waveform shape of the drive signal component is varied linearly or non-linearly.

8. An apparatus as claimed in claim 1, wherein the image distortion comprises keystone distortion, parallelogram distortion, pincushion distortion, barrel distortion, surface profile distortion, surface relief distortion, intentional distortion, or arbitrary distortion.

9. A method, comprising:
generating a light beam with a light source;
generating a scan drive signal in response to a video signal with a scan drive circuit;
receiving the beam of light and generating a raster pattern with a scanning platform in response to the scan drive signal to project an image onto a projection surface; and
at least partially correcting distortion in the projected image by varying an amplitude of the scan drive signal via the scan drive circuit to at least partially compensate for the distortion in the projected image, wherein the scan drive signal comprises a drive signal component, said scan drive circuit varying an amplitude or waveform shape of the drive signal component as a function of time in the raster pattern to at least partially correct the distortion in the projected image.

10. An apparatus as claimed in claim 9, wherein said scan drive circuit varying an amplitude of the drive signal component along a first axis of the raster pattern as a function of position in the raster pattern along a second axis of the raster pattern to at least partially correct the distortion in the projected image.

11. An apparatus as claimed in claim 10, the drive signal component comprising a horizontal drive signal component, or a vertical drive signal component, or combinations thereof, wherein the amplitude of the drive signal component is varied by increasing the amplitude, or decreasing the amplitude.

12. An apparatus as claimed in claim 10, the drive signal component comprising a horizontal drive signal component, or a vertical drive signal component, or combinations thereof, wherein the amplitude of the drive signal component is varied linearly or non-linearly.

13. An apparatus as claimed in claim 9, wherein the scan drive signal comprises a horizontal drive signal component, said scan drive circuit varying an amplitude of the horizontal drive signal component as a function of vertical position in the raster pattern to at least partially correct the distortion in the projected image.

14. An apparatus as claimed in claim 9, wherein the scan drive signal comprises a vertical drive signal component, said scan drive circuit varying an amplitude or waveform shape of the vertical drive signal component as a function of time in the raster pattern to at least partially correct the distortion in the projected image.

15. An apparatus as claimed in claim 9, the drive signal component comprising a horizontal drive signal component, or a vertical drive signal component, or combinations thereof, wherein the amplitude or waveform shape of the drive signal component is varied linearly or non-linearly.

16. An apparatus as claimed in claim 9, wherein the image distortion comprises keystone distortion, parallelogram distortion, pincushion distortion, barrel distortion, surface profile distortion, surface relief distortion, intentional distortion, or arbitrary distortion.

17. An apparatus, comprising:
a light source to generate a light beam;
a scan drive circuit to generate a scan drive signal in response to a video signal;
a scanning platform to receive the light beam and generate a raster pattern in response to the scan drive signal to project an image onto a projection surface; and
an image distortion detector circuit to detect distortion in the projected image;
said scan drive circuit being capable of at least partially correcting distortion in the projected image by varying an amplitude of the scan drive signal to at least partially compensate for the distortion in the projected image detected by said image distortion detector circuit, wherein the scan drive signal comprises a drive signal component, said scan drive circuit varying an amplitude or waveform shape of the drive signal component as a function of time in the raster pattern to at least partially correct the distortion in the projected image.

18. An apparatus as claimed in claim 17, said image distortion detector circuit comprising an image detector, a motion detector, or an orientation detector.

\* \* \* \* \*